Patented Jan. 15, 1952

2,582,911

UNITED STATES PATENT OFFICE 2,582,911

PREPARATION OF ACRYLIC ESTERS

Harry T. Neher, Bristol, Edward H. Specht, Philadelphia, and Andrew Neuman, North Hills, Pa., assignors to Rohm & Haas Company, Philadelphia, Pa., a corporation of Delaware No Drawing. Application July 12, 1950,
Serial No. 173,482

24 Claims. (Cl. 260—486)

This invention deals with a method for preparing acrylic esters, particularly esters of acrylic acid and saturated, monohydric, aliphatic alcohols, ROH, in which R is an alkyl group. This invention more specifically concerns a process for preparing acrylic esters in which there are brought together at relatively low temperatures a monohydric alcohol, acetylene, carbon monoxide, nickel carbonyl, and an acid, all in proper relation as shown below, and an acrylic ester is separated.

Reaction of alcohol, acetylene, nickel carbonyl, and acid has been shown to produce acrylates under mild conditions of reaction. The reaction may be at least theoretically represented, as applied to the preparation of ethyl acrylate,

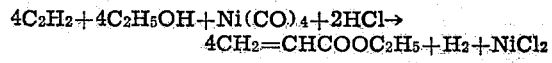

$$4C_2H_2 + 4C_2H_5OH + Ni(CO)_4 + 2HCl \rightarrow 4CH_2=CHCOOC_2H_5 + H_2 + NiCl_2$$

In actual experiments it was found, however, that little if any hydrogen was actually evolved. It was taken up apparently in secondary reactions which involved the carbonyl and acrylate. For example, propionate esters to the extent of as much as fifteen per cent were formed in some reaction mixtures. While high boiling impurities, such as alkyl vinylpropionates, can be separated, alkyl propionates are separable from the alkyl acrylates which they contaminate only with considerable difficulty and by very expensive procedures.

Since the basic reaction involved appeared to be that between acetylene, carbon monoxide, and alcohol,

$$C_2H_2 + CO + ROH \rightarrow CH_2=CHCOOR$$

various attempts were made to effect this reaction in the presence of catalysts. It was found that at elevated temperatures (130°–180° C.) and under high pressures (about 30 atmospheres) these three materials could be reacted in the presence of a catalyst such as nickel bromide or nickel iodide. At temperatures at which this reaction was performed, nickel carbonyl was formed and was in part swept out of the reaction mixture and was also rapidly decomposed, since it boils under normal pressure at 43° C. with decomposition. The net result was depletion of catalyst. At temperatures below 130° C., the reaction was too slow to be practical under the conditions of the prior art and even in the range of temperatures used, there were reports of decomposition of acetylene with formation of carbon and clogging of apparatus. Also, at the high temperatures required the tendency of acrylates toward polymerization was marked, the use of low boiling alcohols was impractical, and the desired esters were contaminated by formation of organic halogen compounds. At the pressures for effecting the above process, the handling of acetylene is hazardous and special apparatus and precautions are needed.

Attempts to react directly acetylene, alcohol, and carbon monoxide, the basic components of the reaction, at a low temperature were not successful in the presence of nickel carbonyl or nickel carbonyl and hydrogen chloride. We have confirmed that a stoichiometric mixture of acetylene and carbon monoxide passes unchanged through alcohol containing nickel carbonyl or nickel carbonyl and hydrogen chloride at 0°–75° C.

We have, however, discovered that the reaction of acetylene, carbon monoxide, and alcohol can in fact be carried on at low or moderate temperatures when effected in the presence of the reaction of acetylene, nickel carbonyl, alcohol, and acid. We have discovered that after the reaction of acetylene, nickel carbonyl, alcohol, and acid has become established, carbon monoxide may then be run into the reaction system and reacted with acetylene and alcohol to yield an acrylic ester. Under these conditions the production of vinylpropionate, propionate, and other by-products and impurities is quite low and acrylate is produced in high yield.

When acetylene is run into a mixture of alcohol, nickel carbonyl, and an acid, a reaction soon begins as is evidenced by absorption of acetylene, rise in temperature, and usually the development of a brownish color. This reaction is hereinafter sometimes referred to as the stoichiometric reaction. Our invention is based upon the discovery that a catalytic reaction between acetylene, carbon monoxide, and alcohol can be superimposed upon this stoichiometric reaction after it has started. This may be accomplished in a number of ways. If the mixture of alcohol, nickel carbonyl, and acid contains excess alcohol, the catalytic reaction may be brought about by the addition of carbon monoxide to the acetylene being run into the mixture after the stoichiometric reaction has become established. Alternatively, the alcohol needed for the catalytic reaction may be added to the reaction mixture along with acetylene and carbon monoxide after the stoichiometric reaction has started. In either of these modifications the catalytic reaction will cease along with the stoichiometric reaction when the nickel carbonyl is exhausted. The process may be made to operate continuously by continuously adding to the reaction mixture nickel carbonyl and acid along with alcohol, acetylene and carbon monoxide so that there will always be present in the reaction mixture the ingredients for the stoichiometric reaction.

The brownish coloration which usually develops in the stoichiometric reaction indicates that a complex product is formed during the reaction and from the fact that reaction between alcohol, acetylene and carbon monoxide does not take place unless the stoichiometric reaction among alcohol, acetylene, nickel carbonyl, and acid is first started, it is reasonable to believe that an intermediate complex material formed during the stoichiometric reaction is the catalyst for the reaction of acetylene, carbon monoxide, and alcohol. This reaction, thus, occurs in liquid medium in the presence presumably of a catalyst formed and continuously generated by reaction of acetylene, nickel carbonyl, acid, and alcohol. The liquid medium can be defined as one comprising alcohol, the catalyst formed as stated, and acrylic ester, said ester being normally formed as the catalyst is generated.

It is often an expedient procedure in effecting the reaction of alcohol, carbon monoxide, and acetylene to add at the start an acrylic ester to a mixture of alcohol, nickel carbonyl, and acid into which acetylene is passed, thus providing from the beginning a reaction medium which is essentially that obtained when the reaction is proceeding under normal or equilibrium conditions.

As has been indicated, the reaction between acetylene, carbon monoxide, and alcohol can be said to take place in the presence of the reaction of acetylene, nickel carbonyl, acid, and alcohol. In the preferred practice after the latter reaction has been established, all five materials are run together into a reaction vessel, the proportions being suitably adjusted, and reaction mixture being continuously withdrawn.

There is a fairly definite upper limit for the proportion of carbon monoxide to nickel carbonyl which can be utilized, particularly under continuous operation. While this upper limit depends in part upon temperature and upon the ratio of nickel carbonyl to acid, in general it can be stated that under favorable conditions a maximum of about 85 mole per cent of the total CO reacted may be supplied by the carbon monoxide, the remainder being obtained from the nickel carbonyl. It is usually advisable for smooth and prolonged operation to operate at somewhat less than this maximum. A range of 60 to 80 mole per cent of CO from carbon monoxide and the balance of CO from nickel carbonyl usually permits consistently efficient and continuous operation. The proportion of carbon monoxide used may be further decreased, if so desired, there being no fixed lower limit for operability, but rather an economic consideration, which indicates than even in extreme cases carbon monoxide should supply at least 20% of the CO requirements.

Another way to define the minimum amount of nickel carbonyl, which is used in the stoichiometric reaction with acid, alcohol, and acetylene and, therefore, the minimum extent of the stoichiometric reaction which must be carried on while acetylene, carbon monoxide, and alcohol are reacted in the medium in which the stoichiometric reaction is occurring, is in terms of moles. At least four moles of nickel carbonyl should be used per 100 moles of carbon monoxide being reacted.

There should be used an amount of acid which is approximately equivalent to the nickel of the nickel carbonyl to form a nickelous salt of the acid. While a slight excess of acid is permissible, for example an excess of 5% or 10%, it is preferred that the acid be not in excess of the carbonyl. It is recommended for most conditions that acid be supplied to the reaction mixture at 80% to 99% equivalence of the nickel or from the reverse point of view that the nickel carbonyl be used in an excess of 1% to 20% over the acid. Excess nickel carbonyl avoids the corrosion which may result when acid is in excess. Free nickel carbonyl can be taken up in the reaction mixture in a final step by addition at that point of enough acid to consume all the nickel carbonyl by reaction with alcohol and acetylene, as will be more fully shown below. With nickel carbonyl present in excess during the main reaction the ratio of carbon monoxide to nickel carbonyl reacted may be kept high and the operation maintained in a balanced, stable state. Another advantage of excess nickel carbonyl in relation to the amount of acid used is that this condition avoids formation of $\beta$-halopropionates when, for example, hydrohalides are used as the acid, the acid being added to the double bond of the acrylate formed in the process. While 1% to 20% excess of nickel carbonyl is preferred, the process is operable with even larger excesses of nickel carbonyl over acid, excesses of the order of 50% having been proved operative, but without economic advantage.

The nickel ultimately appears as the nickel salt of the acid used and can be recovered, reconverted to nickel carbonyl, and thus re-used. Of course, the larger the proportion of CO supplied as carbon monoxide, the smaller is the amount of nickel to be recovered, and reconverted to nickel carbonyl and the greater on this score is the advantage of the process of this invention.

The process for preparing acrylates as here described is performed between about 0° and about 75° C. The most favorable temperatures lie between 30° and 50° C. with many alcohols, although there are some alcohols which are reacted advantageously at higher or lower temperatures. Since considerable heat is evolved in the reaction, temperatures rise and cooling becomes necessary. In some cases the rate at which heat of reaction can be removed becomes a limiting factor in the rate at which the reaction components can be combined.

With most alcohols and with the more active acids the reaction can be performed without use of pressure. In the most reactive systems the actual pressure in the reaction vessel may be only slightly above that of the vapor pressure of a mixture of alcohol and acrylate. With less reactive combinations or with cooling facilities for reactive combinations the system may be operated under pressures, such as 10 or 15 pounds gage or more, if so desired.

While in the reactions here involved stoichiometric proportions of alcohol, acetylene, and CO (available from carbon monoxide gas and from the combination of nickel carbonyl and acid) combine, they need not be supplied to the reaction system in such exact proportions. Excess of acetylene or of alcohol with respect to the CO is often advantageous. An excess of 1% to 10% of acetylene over the total CO is a preferred state, although it is possible to operate the process with excess CO provided the defined preferred relationships with nickel carbonyl and acid are maintained.

An excess of alcohol of 10% to 300% (based on either the total CO available or the acetylene) is generally advantageous. This permits carrying off the nickel salt formed in the reaction, either in suspension or in solution. The alcohol may also serve to keep the reaction mixture fluid and mobile and thus make it more readily handled.

There may likewise be used an inert organic solvent such as dioxane, benzene, toluene, xylene, ethylene dichloride, chloroform, carbon tetrachloride, ethyl acetate, acetone, methyl ethyl ketone, isopropyl ether, or the like. Such solvents are recommended when the reacting alcohol is viscous or solid.

Reaction of acetylene, alcohol, and nickel carbonyl proceeds when an acid is added thereto. When the alcohol is a saturated, monohydric aliphatic one, hydrogen chloride is most satisfactory, being economical and efficient and allowing the reaction to proceed very rapidly. Hydrogen bromide is also effective, but relatively costly. Hydrogen fluoride containing a trace of chloride gives less rapid reaction, and hydrogen iodide also gives a slow action and may impart an instability to the reaction system. With phosphoric acid the reaction becomes quite slow and pure sulfuric acid is even less effective, possessing a disadvantage in its proclivity to form alkyl sulfates. It is of interest, however, that a small amount of chloride added to either acid greatly accelerates the desired reaction.

Organic acids in general cause the reaction to proceed but generally at a slower rate than with the hydrogen halides. There are instances, however, in which the organic acids are definitely preferable to the inorganic acids. This is noticeably true when allylically unsaturated alcohols are used as reactants. Thus, when allyl alcohol is used, best results are obtained with an acid such as acetic, propionic, or acrylic. Alcohol and some of the acid then combine to give the corresponding ester. Acrylic acid is advantageous in giving directly an acrylate of the type sought, thus avoiding a need for separation of esters. Other acids such as benzoic, monochloroacetic, succinic, maleic, oxalic, and the like can also be used.

The present application is directed to preparation of acrylic esters, primarily of saturated monohydric alcohols of the aliphatic series, ROH, wherein R is an alkyl group. This group may be small or large, primary, secondary, or tertiary, branched or straight chained. Typical groups for R are methyl, ethyl, propyl, butyl, amyl, hexyl, octyl, nonyl, decyl, dodecyl, hexadecyl, and octadecyl, or even larger, in their various isomeric forms.

The reaction is not, however, confined to such alcohols and there may be used in place of such simple acyclic alcohols alicyclic alcohols, such as cyclohexyl, methylcyclohexyl, terpenyl, dicyclopentenyl, or dicyclopentanyl. Similarly unsaturated aliphatic alcohols may be used, such as allyl, methallyl, chloroallyl, crotyl, propargyl, undecenyl, or linoyl, or an arylaliphatic acohol such as cinnamyl. The alcohol may also be arylaliphatic of alicyclicaliphatic as in benzyl, methylbenzyl, butylbenzyl, phenylethyl, β-cyclohexylethyl, hexahydrobenzyl, or tetrahydrobenzyl alcohols.

The reaction is not confined to alcohols having hydrocarbon residues. There may be present other substituents, such as oxygen, sulfur, nitrogen, the halogens, and the like. Some typical substituted alcohols are furfuryl alcohol, tetrahydrofurfuryl alcohol, 2,5-diemethyl-2- hydroxymethyl - 2,3 - dihydropyran, and 2,5-dimethyl-2-hydroxymethyltetrahydropyran, as examples of heterocyclic alcohols; methoxyethanol, ethoxyethanol, ethoxypropanol, ethoxybutanol, butoxyethanol, octoxyethanol, alloxyethanol, vinoxyethanol, methoxyethoxyethanol, butoxyethoxyethoxyethanol, phenoxyethanol, butylphenoxyethoxyethanol, cyclohexoxyethanol, benzoxyethoxyethanol, or 2-phenoxy-1-propanol, as examples of ether alcohols; thioether alcohols such as ethylthioethanol, butylthioethanol, or phenylthioethanol; nitroalcohols such as nitroethanol, 2-nitropropanol, 2-nitrobutanol, 2-nitro-2-phenylethanol, etc.; ketoalcohols such as acetoin, β-acetylethyl alcohol, β-hydroxyethyl acetone; cyanohydrins and halohydrins, such as ethylene cyanohydrin and ethylene chlorohydrin, etc.

Polyhydric alcohols can also be used and one or more of the hydroxyl groups reacted. Typical alcohols of this type are ethylene glycol, propylene glycol, butylene glycol, diethylene glycol, triethylene glycol, glycerin, ethers of glycerine, pentaerythritol, mannitol, sorbitol, and the like.

It is not essential that the alcohol be anhydrous, as it has been observed that small amounts of water in the alcohol do not interfere with the formation of esters. As a matter of fact, acrylic acid or even acrylic anhydride is formed from the water and can react with the alcohol to yield ester. With large amounts of water some free acrylic acid may result.

The acetylene and carbon monoxide used should be at least low in oxygen or preferably free of oxygen. From tests it appears that the gases should contain less than a half per cent of oxygen if stable continuous operation is to be effected. The gases should contain no appreciable amount of sulfide or lower valence phosphorus compounds or arsine which are sometimes found in acetylene. Conventional methods, such as oxidation on ferric or cupric chloride, ordinarily remove such impurities from acetylene. Inert gases such as carbon dioxide, nitrogen, or hydrogen act merely as diluents. There may thus be used commercial sources of either acetylene or carbon monoxide with no more than simple precautions.

In the practical operation of the process for making acrylates a reaction vessel is charged with the alcohol from which the acrylic ester is to be made. Nickel carbonyl is added thereto, either pure or as a solution in organic solvent. Acid is added and acetylene is run in. In the absence of air or oxygen the reaction starts almost immediately. There is usually formed a brownish material which is dispersed or dissolved in the reaction mixture. It is possible that this colored product is a complex such as $Ni(CO)_n \cdot (C_2H_2)_m$ where $n+m=4$. The exact nature of this colored product is not known, however, nor is exact knowledge of its composition essential to the operation of the process of this invention.

It is usually expedient to displace air from the apparatus at the start by flushing with an inert gas such as nitrogen. The nitrogen is displaced with acetylene and the reaction mixture is maintained free of oxygen by the flow of acetylene or acetylene and carbon monoxide.

As soon as there is indication of the stoichiometric reaction, carbon monoxide is admitted. The carbon monoxide reacts with acetylene and alcohol catalytically to form acrylic ester while at the same time acetylene, nickel carbonyl, acid, and alcohol continue to react in the stoichiometric reaction to form acrylic ester. As long as the stoichiometric reaction takes place the catalytic reaction continues. If through some inadvertence the reaction of alcohol, nickel carbonyl, acid, and acetylene fails, the reaction of acetylene, carbon monoxide, and alcohol ceases. It is then necessary to discontinue the flow of carbon monoxide into the system and re-establish the stoichiometric reaction. After the reaction of the four components has again been established, the reaction of acetylene, carbon monoxide, and alcohol is resumed. The last trace of nickel carbonyl can be utilized by shutting off the supply of carbon monoxide and reacting any remaining nickel carbonyl with acetylene, alcohol, and acid.

The process as described lends itself well to continuous operation. For such method the reaction vessel is charged with alcohol and nickel carbonyl. Acid and acetylene are run in. As soon as there is evidence of reaction, the flow of carbon monoxide is started. There are then run continuously into the reactor acetylene, carbon monoxide, alcohol, acid, and nickel carbonyl. The alcohol may be utilized for carrying in the nickel carbonyl and the acid. The rates of addition of the various components of the reaction mixture are adjusted to give advantageous proportions, as discussed above. The reaction mixture is stirred, agitated, or circulated to ensure intimate mixing of all materials. The mixture may in part be recycled, if desired. As material is constantly added, reaction mixture is continually drawn off. The effluent is desirably treated with acetylene and, if necessary, acid to consume any unreacted nickel carbonyl. The effluent is worked up so as to separate alcohol and ester and to recover nickel salts. This may be done by washing the reaction mixture with water and distilling acrylate and alcohol.

Under the preferred conditions of operating it is ordinarily not necessary to add a polymerization inhibitor to the reaction mixture. There may, however, be circumstances under which small amounts of materials such as β-naphthol, pyrogallol, resorcinol, or other inhibitor are desirable and may be added during the reaction. Such an inhibitor becomes important during the isolation and purification of the acrylic ester.

The following illustrative examples give further details of the process and also show variations in procedural steps, whereby the process may be adapted to different types of apparatus and to different alcohols.

*Example 1*

An apparatus was constructed with a pump, a vertical tube surrounded with a jacket through which cooling water could be circulated, and a surge vessel. The pump was arranged to receive reactants and pass them into the vertical tube from which they flowed to the surge vessel. The surge vessel was arranged so that a constant volume remained in it and solution therefrom overflowed to a receiver.

At the start the apparatus was flushed with nitrogen and the tube was charged with 698 parts by weight of methyl acrylate and 260 parts by weight of methanol. The pump was started and reactants were introduced into the reaction system as follows: acetylene at the rate of 25 parts by weight per hour, anhydrous hydrogen chloride at the rate of 18 parts per hour, and nickel carbonyl at the rate of 48 parts per hour. In a short time a brown color began to develop in the tube and the acetylene was then absorbed. The rate of introduction of acetylene was increased to 130 parts per hour. Carbon monoxide was pumped in at the rate of 109 parts per hour and methanol at the rate of 318 parts per hour. The temperature of the reaction mixture in the tube was held at 45° C. by the passage of cooling water through the jacket. The system was operated at essentially atmospheric pressure. The rate of supply of methanol was sufficient to hold in solution the nickel chloride resulting from reaction of nickel carbonyl and acid. At the end of six hours there had been collected in the receiver 4490 parts of reaction mixture. This was treated with 47 parts of 35% hydrochloric acid solution and acetylene was passed in until it was no longer taken up. The reaction mixture thereupon was washed four times with water, the total amount of water being 9000 parts. There was separated an oily product in an amount of 2420 parts. This was subjected to distillation. A forerun was taken off and then a main fraction of 2040 parts was collected at 79°–80° C. The forerun and the wash liquors were worked up and 750 parts of a product boiling at 79°–80° C. was obtained. The main fraction and the product just mentioned were identified as almost pure methyl acrylate. The combined fractionated product was found by infrared absorption to contain 1.7% of methyl propionate. Polymerization thereof was readily accomplished upon adding benzoyl peroxide and heating.

*Example 2*

A reaction vessel was equipped with cooling coil, thermometer, inlet tube at the bottom, overflow tube at the top, paddle-type stirrer, and reflux condenser. There was placed in the vessel 800 parts of ethyl acrylate and 171 parts of anhydrous ethanol. The system was flushed with acetylene. The following reactants were then run through the inlet tube into the reaction vessel—acetylene at the rate of 31 parts by weight per hour, anhydrous ethanol at 307 parts per hour, nickel carbonyl at 60 parts per hour, and anhydrous hydrogen chloride at 21.7 parts per hour. After 19 minutes a brown coloration appeared, the temperature of the reaction mixture began to rise, and little gas was vented. At this point the flow of acetylene was increased to a rate of 130 parts per hour and carbon monoxide was introduced at the rate of 100 parts per hour. The temperature was controlled at 40° C. by passage of cooling water through the coil. Gas absorption was almost complete, the amount of vent gas being less than 2% of the gases being introduced. During the reaction solid nickel chloride precipitated and formed a slurry. The introduction of materials was discontinued at the end of six hours. The reaction mixture was treated with an excess of hydrogen chloride and acetylene was passed in until it was no longer absorbed. The reaction mixture was washed with water three times, the total volume of water being about equal to that of the reaction mixture. The organic layer was then distilled. After a forerun had been taken off, there was obtained a main fraction of 2590 parts by weight. It boiled at 99°–100° C. and was identified as ethyl acrylate. The refractive index of the product was 1.4055 at 20° C. and the saponification number was 560. From the wash waters and the forerun there was recovered a fraction of 590 parts which also proved to be ethyl acrylate. The product amounted to 83% of the theoretical yield based on combined nickel carbonyl and carbon monoxide. It was likewise 83% of theory calculated on acetylene. The product was examined by infrared absorption and was found to contain less than 2% of ethyl propionate. A portion of the product was treated with 0.5% of benzoyl peroxide and warmed. Polymerization occurred in a short time.

The procedure just described was followed but the reaction mixture from the overflow was conducted to a second and smaller vessel to which there was fed a supply of alcohol in an amount of 5% of the theoretical requirements for the reaction, sufficient hydrogen chloride to react with nickel carbonyl left unreacted in the main reaction vessel, and acetylene. The alcohol fed to the main reaction vessel was 140% of that required to react with the CO from both carbon monoxide and the nickel carbonyl reacted with hydrogen chloride. The acetylene was fed in 1% excess over that required for the total CO available. The alcohol used contained 0.7% water. The nickel carbonyl was fed in 10% excess over the hydrogen chloride fed to the main reaction vessel. Carbon monoxide was supplied at a rate to provide 80 mole per cent of the CO from both carbon monoxide and that part of the nickel carbonyl reacting with acid.

As reaction mixture was taken off from the smaller vessel, it was washed with water to remove nickel chloride and the organic layer was fractionated in a column. The recovered alcohol was redistilled in the presence of benzene and returned to the alcohol feed. The acrylate was treated with 0.05% of β-naphthol and redistilled to give ethyl acrylate which contained less than 1.5% of ethyl propionate. The process was kept in continuous operation for two weeks. The yield was 80% to 85% based on acetylene or CO.

*Example 3*

The reactor system was so arranged that all reactants were fed continuously into the reaction mixture stream just prior to its passage through a pump which rapidly circulated the mixture through a water-jacketed tube, into a surge vessel, and back to the pump. An initial volume (ca. 1050 cc.), made up of 647 grams of isopropyl acrylate and 323 grams of isopropanol was charged to the empty reactor. This allowed sufficient volume for circulation. The system was flushed substantially air-free by passing through it about 0.5 cubic foot of nitrogen. The circulation pump was started and reactant feeds were introduced at the following rates: acetylene, 31 grams per hour; anhydrous hydrogen chloride, 21.7 grams per hour; nickel carbonyl, 59.8 grams per hour and isopropanol, 118 grams per hour. After twenty minutes the reaction mixture became a deep brown color, the acetylene rate was then increased, and carbon monoxide gas was introduced. The rates of flow of acetylene and carbon monoxide gas were increased at five minute intervals, i. e.,

| Interval | Acetylene | Carbon Monoxide Gas |
|---|---|---|
|  | Grams/hr. | Grams/hr. |
| 1st 5 mins | 81.4 | 50.4 |
| 2nd 5 mins | 92.9 | 62.5 |
| 3rd 5 mins | 108.5 | 78.4 |

The final rates, acetylene, 130 grams per hour and carbon monoxide, 101 grams per hour, were maintained for a period of 5.4 hours. Additional isopropanol, 374 grams per hour was introduced when the final rates of acetylene and carbon monoxide gas were attained. Reaction was maintained for a period totalling about six hours, until the nickel carbonyl feed reservoir was emptied. During this period the temperature of the reaction mixture was maintained at 40°–43° C. by cooling. After the reactor became filled to a predetermined volume, the level was held constant by continuous withdrawal from the surge vessel. The pressure in the system was essentially atmospheric with the prevailing reactant ratios (molar) consistently corresponding to about 15% excess nickel carbonyl, 70% excess isopropanol, and 5% excess acetylene based on the carbon monoxide equivalent to the hydrogen chloride and carbon monoxide gas. A total of 5460 grams of reaction mixture, containing suspended nickel chloride, was obtained. After removal of unreacted nickel carbonyl, by passing a stream of 31 grams per hour of acetylene and 21.7 grams per hour of anhydrous hydrogen chloride, the product was washed with 14,200 grams of water. Fractional distillation of the washed organic material and steam distillation of the aqueous layer gave a total of 3450 grams of ester, 647 grams of which was precharged. The main fraction of the distillate from the washed organic material, collected at 53°–55° C. vapor temperature and 100 mm. pressure, had a saponification number corresponding to 99% ester and a purity of 98% by bromine number for the isopropyl acrylate.

*Example 4*

Using the same system employed in the preparation of isopropyl acrylate, n-propanol was used in place of isopropanol for the preparation of n-propyl acrylate.

The reactor system was charged with an initial volume consisting of 586 parts of n-propyl acrylate and 309 parts of n-propanol. After the system had been flushed with nitrogen, the circulation pump was started, and the reactants were introduced. The rates of reactant feeds were: acetylene, 31 parts per hour; anhydrous hydrogen chloride, 21.7 parts per hour; nickel carbonyl, 61.5 parts per hour; n-propanol, 158 parts per hour. The reaction mixture became a dark brown color after fifteen minutes and the acetylene rate was increased to 81.4 parts per hour, simultaneously introducing the carbon monoxide gas at a rate of 50.4 parts per hour. The rates of acetylene and carbon monoxide gas were increased at five minute intervals until the final rates (acetylene, 130 parts per hour; carbon monoxide gas, 101 parts per hour) were attained. The intermediate rates were 92.9 and 108.5 parts per hour acetylene and 62.5 and 78.4 parts per hour carbon monoxide gas, respectively. Additional n-propanol was introduced at the rate of 416 parts per hour and the reaction continued for 5.6 hours until the nickel carbonyl reservoir was emptied. The temperature of the reaction mixture was maintained at 40°–42° C. by cooling. The system was operated essentially at atmospheric pressure with the liquid level maintained at predetermined volume by continuous withdrawal of the reaction mixture which contained suspended nickel chloride. At the final reactant rates, the following reactant molar excesses were maintained: 101% n-propanol and 5% acetylene based on carbon monoxide equivalent to the gas and hydrogen chloride. Based on hydrogen chloride the molar excess of nickel carbonyl was about 17%. The total reaction mixture collected was 5928 parts which was treated for removal of unreacted nickel carbonyl and then washed with a total of 21,400 parts of water. A total of 3230 parts of n-propyl acrylate was obtained, allowing for the ester precharge. This corresponds to conversions of 79.5–81% on the basis of either carbon monoxide or acetylene charged.

*Example 5*

Using the same system employed in the preparation of isopropyl acrylate, n-butyl alcohol was used in the place of isopropanol for the preparation of n-butyl acrylate.

The reactor system was charged with an initial volume consisting of 757 parts of n-butyl acrylate and 216 parts of n-butyl alcohol. After the system had been flushed with nitrogen, the circulation pump was started, and the reactants were introduced at the following rates: acetylene, 31 parts per hour; anhydrous hydrogen chloride, 21.7 parts per hour; nickel carbonyl, 59.7 parts per hour; and n-butyl alcohol, 156 parts per hour. The reaction mixture became a dark brown color after fourteen minutes and the acetylene rate was increased to 81.4 parts per hour with simultaneous introduction of carbon monoxide gas at a rate of 50.4 parts per hour. After five minutes the rates were increased to 92.9 parts per hour for acetylene and 62.5 parts per hour for carbon monoxide. At the end of another five minutes, the rates were again increased to 108.5 and 78.4 parts per hour, respectively, with the final rates of 130 and 101 parts per hour being attained after another five minutes. Additional n-butyl alcohol was then introduced at the rate of 327 parts per hour and the reaction continued for a total of about six hours, until the nickel carbonyl reservoir was emptied. The temperature of the reaction mixture was held at 40°–42° C. by cooling. The system was operated essentially at atmospheric pressure with the liquid level maintained at a predetermined volume by continuous withdrawal of the reaction mixture which contained suspended nickel chloride. At the final reactant rates, the following reactant molar excesses were maintained: 37% of n-butyl alcohol and 5% of acetylene based on carbon monoxide equivalent to the gas and hydrogen chloride. Based on hydrogen chloride the molar excess of nickel carbonyl was about 14.5%. The total reaction mixture collected was 5415 parts which was treated for removal of unreacted nickel carbonyl and then washed with a total of 5500 parts of water in two equal portions. A total of 3253 parts of n-butyl acrylate was obtained; allowing for the ester precharge, this corresponds to conversions of 83–87% on the basis of either total CO or acetylene charged.

*Example 6*

Using the same system employed in the preparation of isopropyl acrylate, sec.-butanol was used in place of isopropanol for the preparation of sec.-butyl acrylate.

The reactor system was charged with an initial volume consisting of 683 parts of sec.-butyl acrylate and 238 parts sec.-butanol. After the system had been flushed with nitrogen, the circulation pump was started and the reactants were introduced. The rates of reactant feeds were: acetylene, 31 parts per hour; anhydrous hydrogen chloride, 21.7 parts per hour; nickel carbonyl, 60 parts per hour and sec.-butanol, 157 parts per hour. The reaction mixture became a dark brown color after fifteen minutes and the acetylene rate was increased to 81.4 parts per hour, with simultaneous introduction of carbon monoxide gas at the rate of 50.4 parts per hour. The rates of acetylene and carbon monoxide gas were increased at five minute intervals until the final rates (acetylene, 130 parts per hour; carbon monoxide gas, 101 parts per hour) were attained. The intermediate rates were 92.9 and 108.5 parts per hour of acetylene and 62.5 and 78.4 parts per hour of carbon monoxide gas. Additional sec.-butanol was introduced at the rate of 392 parts per hour and the reaction continued for about 5.5 hours until the nickel carbonyl reservoir was emptied.

The temperature of the reaction mixture was maintained at 40°–41° C. by cooling. The system was operated essentially at atmospheric pressure with the liquid level held at a predetermined volume by continuous withdrawal of the reaction mixture which contained suspended nickel chloride. At the final reactant rates, the molar excess of sec.-butanol was about 60% and of acetylene 5% based on the carbon monoxide equivalent to carbon monoxide gas and hydrogen chloride. Based on hydrogen chloride the molar excess of nickel carbonyl was about 15%. The total reaction mixture collected was 5771 parts which was treated for removal of unreacted nickel carbonyl and then washed with about 6200 parts of water. A total of 3980 parts of sec.-butyl acrylate was obtained. With allowance for the ester precharge, this corresponds to conversions of 88–90% on the basis of either total CO or acetylene charged.

*Example 7*

Using the same system employed in the preparation of isopropyl acrylate, isobutanol was used in place of isopropanol for the preparation of isobutyl acrylate.

The reactor system was charged with an initial volume made up of 622 parts of isobutyl acrylate and 237 parts of isobutanol. After the system had been flushed with nitrogen, the circulation pump was started and the reactants were introduced at the following rates: acetylene, 26.5 parts per hour; anhydrous hydrogen chloride, 19.6 parts per hour; nickel carbonyl, 54 parts per hour; and isobutanol, 161 parts per hour. These rates were continued for 17 minutes, when the reaction mixture became a dark brown color. The acetylene rate was then increased to 83.7 parts per hour, with simultaneous introduction of carbon monoxide gas at the rate of 54.8 parts per hour. These rates were continued for five minutes and were then adjusted to 97.5 parts per hour and 69.7 parts per hour, respectively, for five minutes and then increased to 117 parts per hour and 90.5 parts per hour, respectively. After a ten minute period the rates were adjusted to acetylene, 130 parts per hour and carbon monoxide gas, 104 parts per hour. Additional isobutanol was then introduced at the rate of 434 parts per hour and the reaction continued for 5.4 hours until the nickel carbonyl reservoir was emptied. The temperature of the reaction mixture was maintained at 42°–43° C. by cooling. The system was operated essentially at atmospheric pressure with the liquid level held at a predetermined level by continuous withdrawal of the reaction mixture which contained suspended nickel chloride. At the final reactant rates, the molar excess of isobutanol was about 80% and of acetylene 5% based on the carbon monoxide equivalent to the gas and hydrogen chloride, with a 15% molar excess of nickel carbonyl based on hydrogen chloride. The total reaction mixture collected was 6028 parts which was treated with hydrogen chloride and acetylene to consume the free nickel carbonyl. The reaction was then washed with a total of 6450 parts water. Distillation of the washed organic layer gave a total of 3890 parts of isobutyl acrylate. With allowance for the ester precharge, this corresponds to a conversion of 88–90% based on either total CO or acetylene charged.

*Example 8*

An apparatus was built with a jacketed tower at the bottom of which reactants could be introduced through an inlet. At the top of the tower a side tube led to a jacketed tube at the bottom of which a tube led to the inlet at the foot of the tower. By means of this arrangement the reactants introduced at the base of the tower caused cycling of the reaction mixture up the tower and down the side tube. An overflow tube was arranged at the top of the side tube to permit constant withdrawal of a part of the reaction mixture when sufficient reactants were being circulated.

The process was started by charging the apparatus with 280 parts of tertiary butyl alcohol. The apparatus was swept out with nitrogen. A flow of acetylene was then started. Nickel carbonyl and anhydrous hydrogen chloride were then introduced. As soon as reaction was initiated, as shown by the development of a brown color, absorption of acetylene took place and the temperature began to rise. Flow rates were then adjusted and reactants were introduced as follows: nickel carbonyl at the rate of 85.5 parts per hour, tert.-butyl alcohol at 542.5 parts per hour, acetylene at 129 parts per hour, carbon monoxide at 79 parts per hour, and hydrogen chloride at 33 parts per hour. The temperature was allowed to rise to 55° C. and maintained at this level by the passage of water through the jackets. Pressure in the apparatus remained at about atmospheric. After a short period of operation a precipitate of nickel chloride appeared and was circulated as a fluid slurry. The reaction mixture was constantly taken off into a receiver. The procedure was discontinued after about four hours. The reaction mixture was treated with 45 parts of aqueous 35% hydrochloric acid and acetylene was bubbled into the acidified mixture to consume all of the nickel carbonyl. The reaction mixture was then washed with water and the organic layer distilled. A main fraction was collected at 118°–120° C. which was found to be tert.-butyl acrylate. Additional ester was recovered from forerun and wash water. The total product amounted to 1353 parts of tert.-butyl acrylate. This was a yield of 68% based on combined carbonyl and carbon monoxide consumed and 71% based on acetylene consumed.

*Example 9*

Using the same system employed in the preparation of isopropyl acrylate, 2-ethylhexanol was used in place of isopropanol for the preparation of 2-ethylhexyl acrylate.

The reactor system was charged with an initial volume consisting of 720 parts of 2-ethylhexyl acrylate and 203 parts of 2-ethylhexanol. After flushing the system with nitrogen, the circulation pump was started and the reactants were introduced. The rates of reactants were: acetylene, 40.8 parts per hour; anhydrous hydrogen chloride, 31.2 parts per hour; nickel carbonyl, 79 parts per hour; and 2-ethylhexanol, 149 parts per hour. After eight minutes the reaction mixture became a dark brown color. The acetylene rate was then increased to 114 parts per hour, and carbon monoxide gas was simultaneously introduced at the rate of 71.8 parts per hour. Additional 2-ethylhexanol was introduced at the rate of 619 parts per hour and the reaction continued for a total of about six hours until the nickel carbonyl reservoir was emptied. The temperature of the reaction mixture was maintained at 42°–43° C. by cooling. The system was operated essentially at atmospheric pressure, the liquid level maintained at a predetermined volume by continuous withdrawal of reaction mixture which contained suspended nickel chloride. At the final reactant rates, the reactant molar excesses were 40% of 2-ethylhexanol and 3% of acetylene based on carbon monoxide equivalent to the carbon monoxide gas and hydrogen chloride. The total reaction mixture, 7128 parts, was treated for removal of unreacted nickel carbonyl as in previous examples and washed with 3550 parts water. Distillation of the washed organic layer gave a total of 4330 parts 2-ethylhexyl acrylate. With allowance for ester precharge, this corresponds to a conversion of 76–79% based on either carbon monoxide or acetylene charged.

*Example 10*

Using the same system employed in the preparation of isopropyl acrylate, n-decanol was used in place of isopropanol for the preparation of n-decyl acrylate.

The reactor system was charged with an initial volume consisting of 876 parts of n-decanol. After the system had been flushed with nitrogen, the circulation pump was started and the reactants were introduced. The rates of addition of reactants were: acetylene, 40.8 parts per hour; anhydrous hydrogen chloride, 31.2 parts per hour; nickel carbonyl, 79 parts per hour; and n-decanol, 149 parts per hour. After seven minutes the reaction mixture became a dark brown color. The acetylene rate was then increased to 114 parts per hour, and carbon monoxide gas was simultaneously introduced at the rate of 71.8 parts per hour. Twenty-eight minutes after the start of the flow of carbon monoxide gas additional n-decanol was introduced at the rate of 818 parts per hour. The reaction was continued for a total of six hours until the nickel carbonyl reservoir was emptied. The temperature of the reaction mixture was maintained at 42°–43° C. by cooling, and the liquid level was held at a predetermined volume by continuous withdrawal of the reaction mixture which contained suspended nickel chloride. At the final reactant rates, the reactant molar excesses were 40% of n-decanol and 3% of acetylene based on the carbon monoxide equivalent to carbon monoxide gas and hydrogen chloride. The total reaction mixture obtained was 8086 parts which was treated for removal of unreacted nickel carbonyl as above and washed with 4800 parts of water. Distillation of the washed organic layer gave a total of 4380 parts n-decyl acrylate which corresponds to conversion of 79–82% based on either total CO or acetylene charged.

Example 11

A reaction vessel was equipped with a paddle-type stirrer, an internal cooling coil, a thermometer, an inlet tube at the bottom for introduction of liquid and gaseous feeds, an outlet tube at the top for vent gases and an overflow pipe to permit continuous withdrawal of reaction mixture.

The alcohol used was an alcohol mixture containing chiefly n-dodecyl alcohol with small amounts of lower and higher alcohols (calculated for n-dodecyl alcohol, hydroxyl number=301; found, 300).

The reaction vessel was swept with nitrogen and charged with 33 parts of the alcohol and 423 parts of ethyl acrylate (substituted for n-dodecyl acrylate), these amounts corresponding approximately to the ratio of alcohol and acrylic ester expected to be present in the reaction mixture in a long, continuous run. The system was swept thoroughly with acetylene and the reactant feeds were started at the rates indicated: acetylene, 26.5 parts per hour; nickel carbonyl, 51 parts per hour; anhydrous hydrogen chloride, 18.3 parts per hour; and dodecyl alcohol, 205 parts per hour. Reaction of these materials started in six minutes as shown by the formation of a deep brown color in the liquid phase, a sharp rise in temperature, and absorption of acetylene. At this time 5.5 parts of nickel carbonyl were added (separate from the above mentioned feed) to bring the concentration of unreacted nickel carbonyl to the approximate level expected in the reaction mixture in a long, continuous run. The temperature was adjusted to 45° C. and held there throughout the reaction.

Ten minutes after the feeds had been started carbon monoxide gas was introduced at a rate of 28 parts per hour; simultaneously, the acetylene feed was increased to a total of 53 parts per hour and the alcohol feed to 410 parts per hour. After ten minutes at these rates, the carbon monoxide, acetylene and alcohol feeds were raised to 42, 66.5 and 512 parts per hour, respectively. After another ten minute interval, the rates were raised to their final values, 49.8, 73.5 and 570 parts per hour, respectively. Continuous withdrawal of reaction mixture through the overflow pipe began after 1.5 hours (total) of operation.

During the period of steady operation, i. e., after the final feed rates had been reached, carbon monoxide gas supplied 64% of the total available CO (from gas and from nickel carbonyl, the amount available from nickel carbonyl being determined by the feed rate of hydrogen chloride). Calculated from the feed rates, the following excesses of reactants prevailed during this period: acetylene, 1-2% excess (based on total available CO); alcohol, 10% excess (based on total available CO); and nickel carbonyl, 20% excess (based on hydrogen chloride). Vent gases, from the top of the reaction vessel, were given off at a rate corresponding to about 1.5% of the combined feed rates of acetylene and carbon monoxide. Pressure in the reaction vessel was essentially atmospheric. Temperature was maintained at 45° C. by cooling.

Nickel carbonyl was fed for a total time of four hours. All other reactant feeds were continued for an additional twenty minutes, at which time a sudden increase in vent gas rate indicated that carbon monoxide was no longer being absorbed. Carbon monoxide and alcohol feeds were discontinued and the acetylene feed rate was reduced to 26.5 parts per hour and the hydrogen chloride feed rate was continued at 18.3 parts per hour. After fifteen minutes, the temperature was falling and vent rate increasing, indicating that all nickel carbonyl had reacted. Reactant feeds were stopped and the reaction mixture drained from the reaction vessel. That part of the reaction mixture previously withdrawn during the run was returned to the reactor and the unreacted nickel carbonyl was used up by the stoichiometric reaction with alcohol, acetylene, and acid. Acetylene and hydrogen chloride were fed for thirty minutes at rates of 26.5 and 18.3 parts per hour, respectively, to complete the reaction.

The reaction mixture, a light tan slurry in which the precipitated nickel chloride remained largely in suspension, was washed with half its volume of warm water to remove nickel chloride. Fractional distillation of the organic layer gave a total of 1680 parts of n-dodecyl acrylate (74% yield, based on nickel carbonyl and carbon monoxide). A purified sample boiled at 119°-122° C. under a pressure of 0.6 mm. of mercury and had a refractive index, $n_D20$, of 1.4435 (from the literature, 1.4440. The saponification number found was 236, corresponding to the calculated value for n-dodecyl acrylate of 234.

Example 12

The alcohol used in this example had the probable structure described by the name 2(1, 3, 3-trimethylbutyl) 5, 7, 7-trimethyloctanol, this being a branch-chained octadecyl alcohol. The hydroxyl number found for this alcohol was 206 (calculated value, 208).

The reaction vessel was the same as that described in the preparation of n-dodecyl acrylate. The system was swept with nitrogen and charged with 135 parts of the octadecyl alcohol and 324 parts of ethyl acrylate (substituted for octadecyl acrylate), these amounts corresponding to the expected ratio of alcohol and acrylic ester to be attained during the course of the reaction. The stirrer was started and the system was swept with acetylene. Reactant feeds were then started at the following rates: acetylene, 26.5 parts per hour; nickel carbonyl, 51 parts per hour; anhydrous hydrogen chloride, 18.3 parts per hour; and octadecyl alcohol, 405 parts per hour. Reaction began in four minutes as shown by the formation of a very deep brown color in the solution, a sharp rise in temperature, and absorption of acetylene. To adjust the concentration of unreacted nickel carbonyl in the mixture to that expected during the course of a long, continuous reaction four parts of nickel carbonyl were added at this time (in addition to the normal feed described above). Temperature was controlled at 45° C. by regulating the flow of cooling water in the internal cooling coil. Six minutes after the reaction had started, carbon monoxide was introduced at a rate of 14 parts per hour; simultaneously, the acetylene and alcohol feeds were increased to 40 and 608 parts per hour, respectively. Thereafter, at ten minute intervals, carbon monoxide, acetylene and alcohol feed rates were increased through the following stages: 18.7, 44.2 and 675 parts per hour, respectively, 28, 53 and 810 parts per hour, respectively, and 34.2, 59 and 900 parts per hour, respectively. Continuous withdrawal of reaction mixture was begun one hour and fifteen minutes after the initial feeds had been started.

During the period of steady operation, i. e., after reaching the final feed rates indicated above, the following conditions prevailed: temperature, 45° C.; pressure, essentially atmospheric; excesses of reactants (based on feed rates): acetylene, 2% (based on total available CO), octadecyl alcohol, 50% (based on total available CO), and nickel carbonyl, 20% (based on hydrogen chloride); carbon monoxide supplied as gas, 55% (based on total available CO); and vent gas rate, 3% (expressed as percentage of combined carbon monoxide and acetylene feeds).

Nickel carbonyl was fed for a total of three hours. Other reactant feeds were continued for an additional fifteen minutes when falling temperature and rapidly increasing vent rate indicated no further absorption of carbon monoxide. Carbon monoxide and alcohol feeds were shut off and the acetylene feed decreased to 26.5 parts per hour and hydrogen chloride feed was continued at 18.3 parts per hour. After ten minutes the temperature fell and the vent rate increased. The feeds were then shut off and the reaction vessel drained. The portion of the reaction mixture withdrawn during the course of the run was then returned to the reaction vessel so that unreacted nickel carbonyl could be used up by the stoichiometric reaction. Acetylene at 26.5 parts per hour and hydrogen chloride at 18.3 parts per hour were fed for twenty-eight minutes to complete the reaction.

The reaction mixture was a light tan suspension in which the precipitated nickel chloride was present as colloidal particles showing little or no tendency to settle. The mixture was washed with one-third of its volume of warm water to remove nickel chloride. Fractional distillation of the washed organic layer gave a total of 1745 parts of octadecyl acrylate (75% yield, based on nickel carbonyl plus carbon monoxide). The purified ester boiled at 120°–130° C. under a pressure of 0.1 mm. of mercury. It had a refractive index, $n_D^{20}$, of 1.4512 (literature value is 1.452) and a saponification number of 171 (calculated value is 173).

*Example 13*

The alcohol used was a commercial grade of stearyl alcohol, an alcohol mixture containing 90% or more n-octadecyl alcohol together with some lower alcohols. This alcohol had a hydroxyl number of 206 (calculated value, 208).

The reaction vessel (the same as that described in the preparation of n-dodecyl acrylate) was swept with nitrogen and charged with 270 parts of ethyl acrylate (substituted for n-octadecyl acrylate), 113 parts of stearyl alcohol and 94 parts of acetone. After the system had been thoroughly swept with acetylene, the following reactant feeds were started at the rates indicated: acetylene, 26.5 parts per hour; nickel carbonyl, 51 parts per hour (fed as a 32% by weight solution in acetone); anhydrous hydrogen chloride, 18.3 parts per hour; and stearyl alcohol, 405 parts per hour (fed as an 84% by weight solution in acetone, maintained at 50° C. to prevent crystallization of the alcohol).

The reaction started after eight minutes, a brown color appearing in the solution, the temperature rising sharply, and absorption of acetylene beginning. The temperature was held at 45° C. by adjustment of the flow of cooling water. Two minutes after reaction started, carbon monoxide was introduced at the rate of 14 parts per hour. At the same time the acetylene feed rate was increased to 40 parts per hour and the stearyl alcohol feed rate to 608 parts per hour (in acetone solution as described above). At ten minute intervals the carbon monoxide feed was increased, together with corresponding increases in acetylene and alcohol feeds; the rates at each stage, in parts per hour, were as follows:

| Carbon Monoxide | Acetylene | Stearyl Alcohol |
|---|---|---|
| 18.7 | 44.2 | 675 |
| 28 | 53 | 810 |
| 34.2 | 59 | 900 |

Continuous withdrawal of reaction mixture through the overflow pipe began fifty minutes after the initial feeds were started.

The final feed rates shown above supplied as gaseous carbon monoxide 55% of the total available CO (from gas and nickel carbonyl). The temperature was maintained at 45° C. by cooling. Pressure in the system was essentially atmospheric, vent gases leaving the system spontaneously through water-cooled condensers, Dry-Ice traps, and a wet test meter. The vent gas rate amounted to less than 2% of the combined carbon monoxide and acetylene feed rates. Acetylene was supplied in 2% excess of that required theoretically for CO from carbon monoxide gas and carbon monoxide available from nickel carbonyl. Nickel carbonyl was fed in 20% excess, based on the hydrogen chloride feed rate. Stearyl alcohol was fed in 50% excess, based on total available CO (as gas and from nickel carbonyl).

Nickel carbonyl was fed for a total of two hours. Other feeds were continued for nine minutes longer when carbon monoxide ceased being absorbed, as indicated by a rapidly increasing vent rate and falling temperature. Carbon monoxide and alcohol feeds were then discontinued, the acetylene feed rate reduced to 26.5 parts per hour, and hydrogen chloride feed was continued at 18.3 parts per hour. After six minutes, increasing vent rate and falling temperature indicated that all nickel carbonyl had reacted. The reaction vessel was drained, the previously withdrawn reaction mixture was returned to the reactor and the unreacted nickel carbonyl used up by the stoichiometric reaction, twelve minutes being required with acetylene and hydrogen chloride feed rates at 26.5 and 18.3 parts per hour, respectively.

The reaction mixture, a slurry containing finely divided nickel chloride, was kept warm to prevent solidification and washed with an equal volume of hot water to remove nickel chloride and most of the acetone. After distillation a total of 1160 parts stearyl acrylate (chiefly n-octadecyl acrylate) was obtained. This corresponded to a yield of 78%, calculated as n-octadecyl acrylate and based on carbon monoxide plus nickel carbonyl. A purified sample boiled at 168°–176° C. under a pressure of 0.3 mm. of mercury. The product had a saponification number of 174 (calculated value is 173).

We claim:

1. A process for preparing an acrylic ester, ROOCCH=CH$_2$, which comprises first mixing together and reacting at a temperature between 0° and 75° C. acetylene, nickel carbonyl, acid, and an alcohol, ROH, and while the reaction of these materials is occurring, adding to this reacting mixture acetylene, carbon monoxide, nickel carbonyl, acid, and alcohol, ROH, and reacting these together between 0° and 75° C., the carbon monoxide supplying 20% up to 85% of the total CO from both said monoxide and nickel carbonyl, and the acid being added in an amount from 50% to 110% of that required to form a nickelous salt of the acid, R being an alkyl group.

2. A process for preparing an acrylic ester, ROOCCH=CH$_2$, which comprises first mixing together and reacting at a temperature between 0° and 75° C. acetylene, nickel carbonyl, acid, and an alcohol, ROH, and while the reaction of these materials is occurring, adding to this reacting mixture acetylene, carbon monoxide, nickel carbonyl, acid, and alcohol, ROH, and reacting these together between 0° and 75° C., the carbon monoxide supplying 20% up to 85% of the total CO from both said monoxide and nickel carbonyl, the acid being added in an amount from 50% to 110% of that required to form a nickelous salt of the acid, and the alcohol and acetylene being added in molecular excess of the total CO available, and separating from the reaction mixture an acrylic ester ROOCCH=CH$_2$, R in the above formulas being an alkyl group of not over 18 carbon atoms.

3. A process for preparing an acrylic ester, ROOCCH=CH$_2$, which comprises first mixing together and reacting at a temperature between 0° and 75° C. acetylene, nickel carbonyl, hydrogen chloride, and an alcohol, ROH, and while the reaction of these materials is occurring, adding to this reacting mixture acetylene, carbon monoxide, nickel carbonyl, hydrogen chloride, and alcohol, ROH, and reacting these together between 0° and 75° C., the carbon monoxide being added as a gas comprising 20% to 85% of the total CO from both said gas and from said nickel carbonyl, the hydrogen chloride being added in an amount between 50% and 110% of that required to form nickelous chloride, R being an alkyl group.

4. The process of claim 3 in which R is the methyl group.

5. The process of claim 3 in which R is the ethyl group.

6. The process of claim 3 in which R is the tertiary butyl group.

7. The process of claim 3 in which R is the 2-ethyl-hexyl group.

8. A process for preparing an acrylic ester, ROOCCH=CH$_2$, which comprises reacting together between 0° and 75° C. nickel carbonyl, acetylene, hydrogen chloride, and an alcohol ROH, R being an alkyl group of not over 18 carbon atoms, in the presence of an inert organic solvent, adding to this reacting mixture along with inert organic solvent and there reacting together between 0° and 75° C. acetylene, carbon monoxide, nickel carbonyl, said alcohol, and hydrogen chloride, the carbon monoxide being added to said reacting mixture in a proportion to provide 60% to 80% of the total CO from both carbon monoxide and nickel carbonyl, the acetylene being added in an amount approximately equivalent to the total CO from both carbon monoxide and nickel carbonyl, the hydrogen chloride being approximately equivalent to the nickel carbonyl to form nickelous chloride, and the alcohol being in stoichiometric excess of the total CO.

9. A process for preparing an acrylic ester which comprises first mixing and reacting together at a temperature between 0° and 75° C. nickel carbonyl, acetylene, an alcohol, and an acid and then adding to the resulting mixture while it is reacting and reacting together at a temperature between 0° and 75° C. acetylene, carbon monoxide, nickel carbonyl, an acid, and an alcohol, the carbon monoxide supplying 20% to 85% of the total CO from both carbon monoxide and nickel carbonyl, the acid being added in an amount equivalent to 50% to 110% of the nickel carbonyl to form a nickelous salt of said acid, and the alcohol being added in stoichiometric excess of the total CO.

10. The process of claim 8 in which R is the octadecyl group.

11. A process for preparing an acrylic ester, ROOCCH=CH$_2$, which comprises reacting together between 0° and 75° C. nickel carbonyl, acetylene, hydrogen chloride, and an alcohol ROH, R being an alkyl group of not over 18 carbon atoms, and, while these materials are reacting, adding to these reacting materials and reacting together at a temperature between 30° and 50° C. acetylene, carbon monoxide, and said alcohol, there being reacted at least four moles of nickel carbonyl per 100 moles of carbon monoxide, the total acetylene being in stoichiometric excess of the total CO available from both carbon monoxide and nickel carbonyl, the alcohol being in a stoichiometric excess of 10% to 300% of the said total CO, and hydrogen chloride being approximately equivalent to the nickel to form nickelous chloride.

12. The process of claim 11 wherein in addition to the excess alcohol there is used an inert organic solvent.

13. The process of claim 12, wherein the alcohol is octadecyl alcohol and the acrylic ester is octadecyl acrylate.

14. The process of claim 11 wherein the alcohol is methyl alcohol and the acrylic ester is methyl acrylate.

15. The process of claim 11 wherein the alcohol is ethyl alcohol and the acrylic ester is ethyl acrylate.

16. The process of claim 11 wherein the alcohol is tert.-butyl alcohol and the acrylic ester is tert.-butyl acrylate.

17. The process of claim 11 wherein the alcohol is 2-2-ethylhexyl alcohol and the acrylic ester is ethylhexyl acrylate.

18. A process for preparing an acrylic ester, ROOCCH=CH$_2$, which comprises reacting together between about 30° and 50° C. nickel carbonyl, acetylene, hydrogen chloride, and an alcohol, ROH, R being an alkyl group of not over 18 carbon atoms, in the presence of excess alcohol and of acrylate, ROOCCH=CH$_2$, adding to this reacting mixture and there reacting together between about 30° and 50° C. acetylene, nickel carbonyl, said alcohol, hydrogen chloride, and carbon monoxide, the carbon monoxide being added to said reacting mixture in a proportion to provide between 20% and 85% of the total CO from both carbon monoxide and nickel carbonyl, the acetylene being added in a stoichiometric excess of the total CO from both carbon monoxide and nickel carbonyl, the hydrogen chloride being added in a proportion approximately equivalent to the nickel carbonyl to form nickelous chloride, and the alcohol being added in a stoichiometric excess over the acetylene.

19. A process for preparing an acrylic ester which comprises first mixing and reacting together between 0° and 75° C. acetylene, nickel carbonyl, hydrogen chloride, and an alcohol in which the residue is aliphatic including cycloaliphatic and arylaliphatic hydrocarbon, then adding to this reaction mixture and therein reacting together between 0° and 75° C. acetylene, carbon monoxide, nickel carbonyl, hydrogen chloride, and said alcohol, the carbon monoxide supplying 20% to 85% of the total CO from both carbon monoxide and nickel carbonyl, the hydrogen chloride being equivalent to 50% to 110% of the nickel carbonyl to form nickelous chloride, and the alcohol being in excess of the total CO.

20. A process for preparing an acrylic ester which comprises reacting together at a temperature between 0° and 75° C. nickel carbonyl, acetylene, an acid, and an alcohol the residue of which is aliphatic including cycloaliphatic and arylaliphatic hydrocarbon, in the presence of an excess of said alcohol, then adding to this reacting mixture acetylene and carbon monoxide, and reacting them together at a temperature between 0° and 75° C. with said alcohol, the carbon monoxide being added in a proportion to supply between 20% and 85% of the total CO from both carbon monoxide and nickel carbonyl.

21. A process for preparing an acrylic ester which comprises reacting together at a temperature between 0° and 75° C. nickel carbonyl, acetylene, an alcohol, and an acid, then adding to this reaction mixture and therein reacting together at a temperature beween 0° and 75° C. acetylene, carbon monoxide, and an alcohol, the carbon monoxide supplying between 20% and 85% of the total CO from both carbon monoxide and nickel carbonyl.

22. A process for preparing an acrylic ester which comprises reacting together at a temperature between 0° and 75° C. nickel carbonyl, acetylene, an acid, and an alcohol in which the non-hydroxyl residue is aliphatic including cycloaliphatic and arylaliphatic hydrocarbon, then adding to this reaction mixture and therein reacting together at a temperature between 0° and 75° C. acetylene, carbon monoxide, and said alcohol, the carbon monoxide supplying between 20% and 85% of the total CO from both carbon monoxide and nickel carbonyl.

23. The process of claim 22 in which the acid is a hydrogen halide.

24. A process for preparing an acrylic ester of a monohydric alcohol which comprises reacting together between about 30° and about 50° C. nickel carbonyl, acetylene, hydrogen chloride, and a saturated monohydric alcohol, ROH, R being aliphatic including cycloaliphatic and arylaliphatic hydrocarbon, and while this mixture is reacting adding thereto and there reacting together at a temperature between 30° and 50° C. acetylene, carbon monoxide, and a said alcohol, the carbon monoxide supplying 20% to 85% of the total CO from both carbon monoxide and nickel carbonyl, the total acetylene being supplied in a stoichiometric excess of 1% to 10% over the total CO, the hydrogen chloride being supplied in an amount sufficient to convert 80% to 99% of the nickel carbonyl to nickelous chloride, and the alcohol being supplied in a stoichiometric excess of the acetylene, taking off reacting mixture, and treating it with hydrogen chloride and acetylene in amounts to react with the nickel carbonyl therein.

HARRY T. NEHER.
EDWARD H. SPECHT.
ANDREW NEUMAN.

REFERENCES CITED

The following references are of record in the file of this patent:

Reppe: "Advances in Acetylene Chemistry." (Intelligence Division Report No. 4149, published as PB-1112, January 25, 1946.) 39 pp.; pp. 21-23 relied upon.